United States Patent
Von Roden et al.

(10) Patent No.: US 11,945,390 B2
(45) Date of Patent: Apr. 2, 2024

(54) DRIVER AIRBAG MODULE AND STEERING DEVICE COMPRISING SUCH A DRIVER AIRBAG MODULE

(71) Applicant: ZF Automotive Safety Germany GmbH, Aschaffenburg (DE)

(72) Inventors: Constantin Von Roden, Karlstein (DE); Johannes Morhart, Großostheim (DE)

(73) Assignee: ZF Automotive Safety Germany GmbH, Aschaffenburg (DE)

( * ) Notice: Subject to any disclaimer, the term of this patent is extended or adjusted under 35 U.S.C. 154(b) by 18 days.

(21) Appl. No.: 17/614,691

(22) PCT Filed: Jun. 24, 2020

(86) PCT No.: PCT/EP2020/067647
§ 371 (c)(1),
(2) Date: Nov. 29, 2021

(87) PCT Pub. No.: WO2020/260364
PCT Pub. Date: Dec. 30, 2020

(65) Prior Publication Data
US 2022/0227323 A1   Jul. 21, 2022

(30) Foreign Application Priority Data
Jun. 27, 2019 (DE) .......................... 202019103552.8

(51) Int. Cl.
*B60R 21/203* (2006.01)
*B60R 21/215* (2011.01)
(Continued)

(52) U.S. Cl.
CPC .......... *B60R 21/203* (2013.01); *B60R 21/215* (2013.01); *B62D 1/08* (2013.01); *B62D 1/10* (2013.01)

(58) Field of Classification Search
CPC .............. B60R 21/203; B60R 21/2032; B60R 21/2035; B60R 21/215; B60R 21/216;
(Continued)

(56) References Cited

U.S. PATENT DOCUMENTS 5,306,042 A * 4/1994 Frank .................... B60R 21/216
  280/732
5,360,231 A * 11/1994 Adams ................ B60R 21/2165
  280/732

(Continued)

FOREIGN PATENT DOCUMENTS

DE     19911682 A1 * 9/2000 ............. B60R 21/05
DE     19951029 A1 * 3/2001 ....... B60R 21/21656
(Continued)

OTHER PUBLICATIONS

International Search Report and Written Opinion for PCT/EP2020/063981 dated Sep. 10, 2020 (11 pages; with English translation).

*Primary Examiner* — Laura Freedman
(74) *Attorney, Agent, or Firm* — Kristin L. Murphy

(57) ABSTRACT

The disclosure relates to a driver airbag module rotatable about a steering axis. The driver airbag module can include an inflatable airbag and a module housing with a housing axis substantially parallel to the steering axis. The module housing can define a receiving chamber for the folded airbag. The receiving chamber is delimited by a housing front wall that faces a vehicle occupant when the driver airbag module is installed, an opposing housing rear wall axially spaced therefrom, and a housing lateral wall extending between the housing front wall and the housing rear wall. The housing lateral wall has an opening section via which the airbag is unfolded when the driver airbag module is activated, and the housing front wall is inclined relative to the housing rear wall.

19 Claims, 4 Drawing Sheets

(51) Int. Cl.
 *B62D 1/08* (2006.01)
 *B62D 1/10* (2006.01)

(58) Field of Classification Search
 CPC ........... B60R 2021/21512; B60R 2021/21537; B60R 2021/2161; B62D 1/08; B62D 1/10
 See application file for complete search history.

(56) References Cited

U.S. PATENT DOCUMENTS

| | | | | |
|---|---|---|---|---|
| 6,024,377 | A * | 2/2000 | Lane, Jr. | B60R 21/20 |
| | | | | 280/732 |
| 6,394,489 | B1 * | 5/2002 | Faigle | B60R 21/2035 |
| | | | | 280/731 |
| 6,581,958 | B2 * | 6/2003 | Holtz | B60R 21/215 |
| | | | | 280/732 |
| 6,874,812 | B2 * | 4/2005 | Keutz | B60R 21/203 |
| | | | | 280/730.1 |
| 7,600,776 | B2 * | 10/2009 | Hoshino | B60R 21/2032 |
| | | | | 280/752 |
| 7,669,890 | B2 * | 3/2010 | Bito | B60R 21/203 |
| | | | | 280/731 |
| 9,834,121 | B2 * | 12/2017 | Riefe | B62D 1/04 |
| 10,899,301 | B2 * | 1/2021 | Kulkarni | B60R 21/2037 |
| 11,072,301 | B2 * | 7/2021 | Klaenhammer | B60R 21/2035 |
| 11,427,147 | B2 * | 8/2022 | Song | B60R 21/21656 |
| 11,518,333 | B2 * | 12/2022 | Song | B60R 21/216 |
| 11,597,345 | B2 * | 3/2023 | Ko | B60R 21/215 |
| 2002/0084634 | A1 * | 7/2002 | Adomeit | B60R 21/2037 |
| | | | | 280/731 |
| 2022/0144201 | A1 * | 5/2022 | Morita | B60R 21/239 |

FOREIGN PATENT DOCUMENTS

| | | | |
|---|---|---|---|
| DE | 20114375 U1 | 2/2002 | |
| DE | 10150772 C1 | 3/2003 | |
| DE | 102017120770 A1 | 3/2019 | |
| EP | 1357001 A2 | 10/2003 | |
| JP | 10071911 A * | 3/1998 | .......... B60R 21/203 |
| JP | 2000264158 A | 9/2000 | |
| WO | 2005044643 A1 | 5/2005 | |

\* cited by examiner

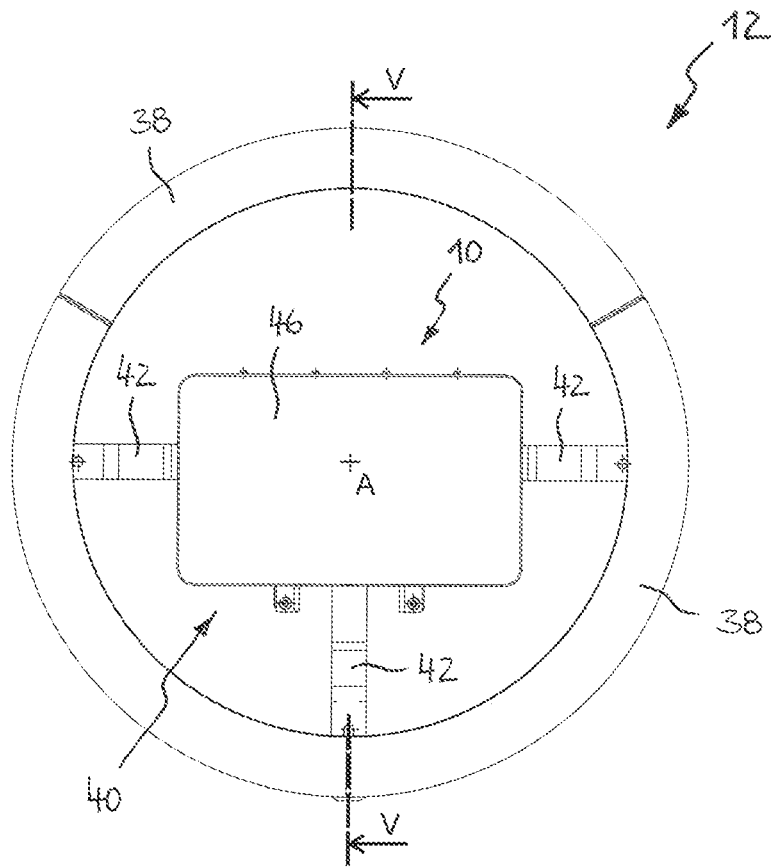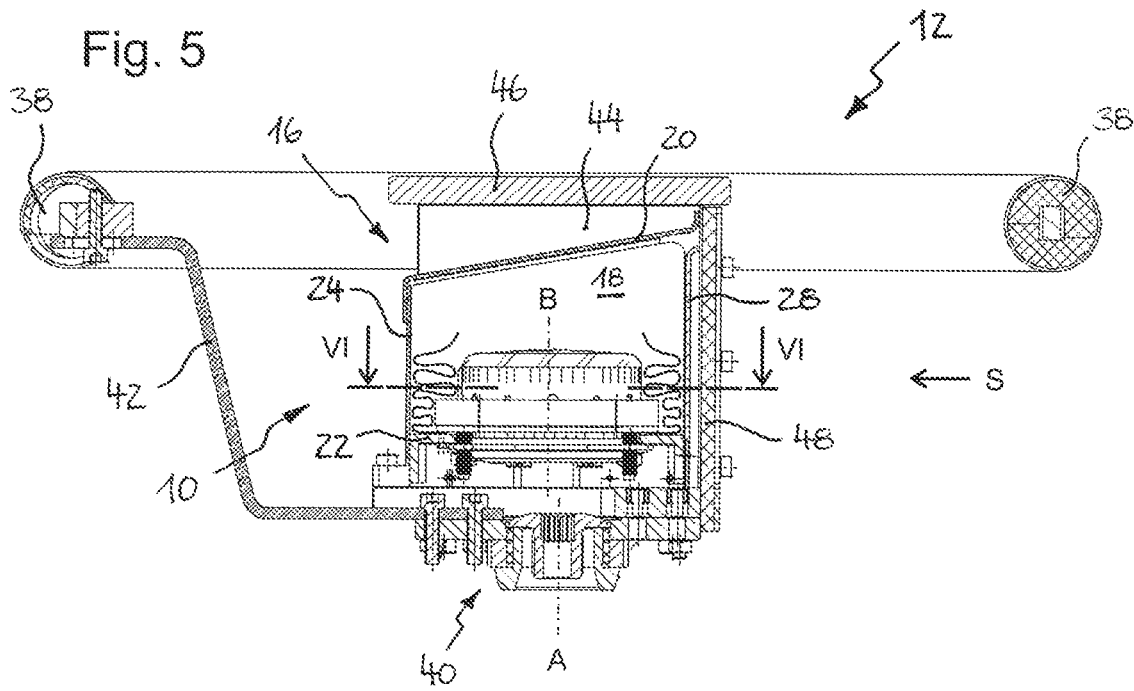

\# DRIVER AIRBAG MODULE AND STEERING DEVICE COMPRISING SUCH A DRIVER AIRBAG MODULE

CROSS-REFERENCE TO RELATED APPLICATIONS

This application is a national stage of International Application No. PCT/EP2020/067647, filed Jun. 24, 2020, the disclosure of which is incorporated herein by reference in its entirety, and which claimed priority to German Patent Application No. 202019103552.8, filed Jun. 27, 2019, the disclosure of which is incorporated herein by reference in its entirety.

TECHNICAL FIELD

The disclosure relates to a driver airbag module for installing on a steering device which can be rotated about a steering axis, comprising an inflatable airbag and a module housing with a housing axis which is substantially parallel to the steering axis which defines a receiving chamber for the folded airbag, the receiving chamber being delimited by a housing front wall which faces a vehicle occupant when the driver airbag module is installed, an opposing housing rear wall which is axially spaced therefrom as well as a housing lateral wall which extends between the housing front wall and the housing rear wall, the housing lateral wall having an opening section via which the airbag is unfolded when the driver airbag module is activated. Moreover, the disclosure also relates to a steering device, in particular a vehicle steering wheel, comprising such a driver airbag module.

BACKGROUND

Currently, driver-side front airbag modules for restraining occupants are usually accommodated in a steering wheel hub, wherein the airbag usually exits the module housing through a housing front wall facing the occupant and deploys toward the occupant when the module is activated. The hub region of the steering wheel located centrally in a field of view of a driver has been largely unused so far for ensuring an easy breaking of the housing front wall and a desired airbag deployment.

In the meantime, there have been intentions, however, to utilize a central hub region of the steering wheel for display and/or input devices, for example, such as a touchscreen. In DE 10 2017 120 770 A1, therefore already a generic driver airbag module is disclosed in which, in the event of module activation, the airbag exits the module housing through an outer face different from the front face, rather than through the front face facing the occupant. Consequently, in this case, a display and/or input device may be disposed on the front face of the airbag module.

New challenges are involved with a lateral exit of the airbag from the module housing, however, to safeguard a desired deployment of the airbag and, thus, a particularly efficient occupant protection.

Therefore, there is a need to provide a driver airbag module that allows for an airbag laterally exiting the module housing, but with the airbag showing a desired and hence a quick predefined and reliably reproducible deployment behavior.

SUMMARY

In accordance with the disclosure, a driver airbag module of the above-mentioned type is provided in which the housing front wall is inclined relative to the housing rear wall. In one exemplary arrangement, each of the housing front wall and/or the housing rear wall is configured to be substantially flat at least on the side facing the folded airbag package. When the driver airbag module is activated, in a receiving chamber of the module housing an increasing gas pressure is formed. The resulting deployment force of the airbag can be directed by inclination of the housing front wall relative to the housing rear wall with low effort specifically in a desired direction, and in one exemplary arrangement, in a direction to the opening section of the housing lateral wall, and can be intensified. This results in the airbag exiting the opening section of the airbag housing at an early stage and, consequently, in the airbag deploying particularly quickly.

In one exemplary arrangement, the receiving chamber for the folded airbag has its largest axial dimension in the area of the opening section of the housing lateral wall and has its smallest axial dimension at the housing lateral wall opposed to the opening section. When the airbag module is activated, the deployment force of the airbag is thus directed particularly efficiently toward the opening section.

According to one exemplary arrangement of the driver airbag module, the housing front wall is inclined relative to the housing rear wall by at least 10°, and in one exemplary arrangement by about 15° to 20°, with the housing rear wall extending substantially perpendicularly to the housing axis. An important direction of the airbag deployment force and, thus, a noticeable effect on the airbag deployment only starts at inclination angles from about 10°. Large inclination angles, on the other hand, result in an undesirably large space required, in particular in the axial direction, which is why the inclination angles are selected to be less than 40°, and in one exemplary arrangement, less than 30°.

On a side of the housing front wall remote from the folded airbag, a spacer for fastening a module cover or a display and/or input device is disposed. In one exemplary arrangement, the spacer is wedge-shaped to compensate, for example, for the inclination of the housing front wall and to achieve an optimum position for the display and/or input device and, resp., the module cover. In several configuration variants, the wedge angle of the spacer can be variably adjusted by the occupant to individually adapt the position of the display and/or input device. Further, a cavity for receiving electric components for the display and/or input device may be provided in the wedge-shaped spacer.

According to one exemplary arrangement of the driver airbag module, the opening section of the housing lateral wall is in the form of a pivoting door, and in one particular exemplary arrangement, wherein the door is pivoted on the housing rear wall side and is radially movable between a closing position and an open position on the housing front wall side. Such a door helps direct the airbag during deployment thereof in a desired main deployment direction, for example between a steering wheel hub and a steering wheel rim to the occupant.

In one exemplary arrangement, a housing front wall side door edge abuts on a door-side housing edge of the housing front wall, the door edge and/or the housing edge being rounded, in particular a rounding radius of the door or housing edge being at least 2 mm. In one exemplary arrangement, the rounding radius of the door is about 5 mm. With respect to the receiving chamber, the edges are rounded especially outwardly, i.e., away from the receiving chamber. In this way, the airbag is reliably prevented, with low effort, from being damaged when it exits the receiving chamber.

Further, the module housing may include a limit stop for the door of the housing lateral wall, the limit stop defining a maximum pivot angle of the door in its open position. Based on a closing position of the door, in one exemplary arrangement, the maximum pivot angle ranges from 30° to 60°.

For the rest, the disclosure also relates to a steering device, for example, a vehicle steering wheel, comprising a grip portion for manually operating the steering device which grip portion can be rotated about a steering axle, a hub portion which is disposed radially inwardly from the grip portion, and a spoke portion which interconnects the grip portion and the hub portion, wherein an afore-described driver airbag module is mounted on the hub portion of the steering device.

The hub portion may include, adjacent to the housing lateral wall of the driver airbag module, a steering device wall in which linear weakening zones extending especially along lateral edges of the door opposed in the circumferential direction are formed. In one exemplary arrangement, the steering device wall especially made from foamed plastic material extends, just as the housing lateral wall, substantially in the axial direction so that also the linear weakening zones are substantially axially aligned.

In one exemplary arrangement, the pivoting door is further adopts a maximum pivot angle in its open position and the grip portion is configured as_a peripheral steering wheel rim, wherein the lateral edges of the door opposed in the circumferential direction extend along a straight line and the maximum pivot angle is selected such that the two straight lines extend through the peripheral steering wheel rim. In one exemplary arrangement, each of the two straight lines can be tangent to the steering wheel rim in a contact point.

BRIEF DESCRIPTION OF DRAWINGS

Further features and advantages of the disclosure will be evident from the following description of an exemplary arrangement with reference to the drawings, wherein:

FIG. 4 shows a top view onto a steering device according to the disclosure comprising a driver airbag module according to the disclosure in its closing position;

FIG. 5 shows a section V-V across the steering device according to FIG. 4;

DETAILED DESCRIPTION

Figure 1:
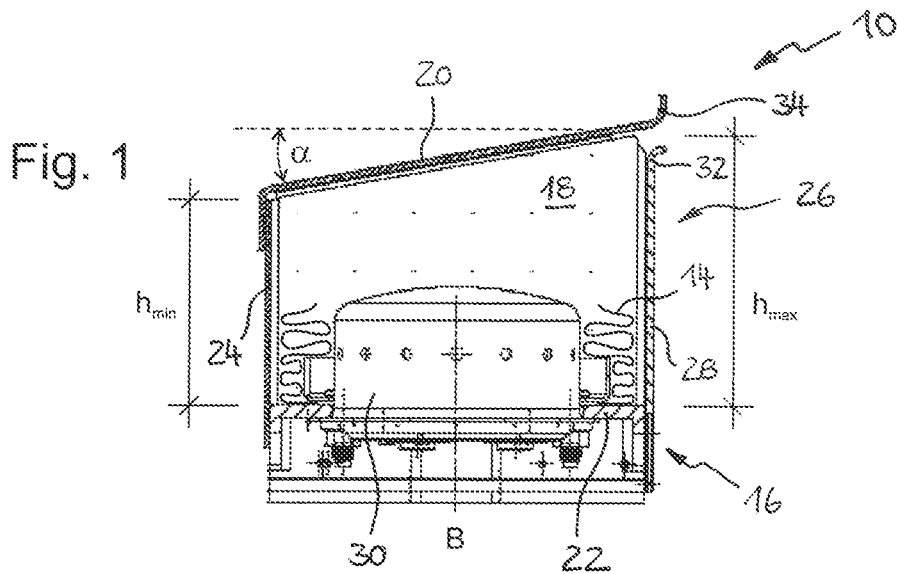
FIG. 1 shows a section across a driver airbag module according to the disclosure in its closing position.
Figure 2:
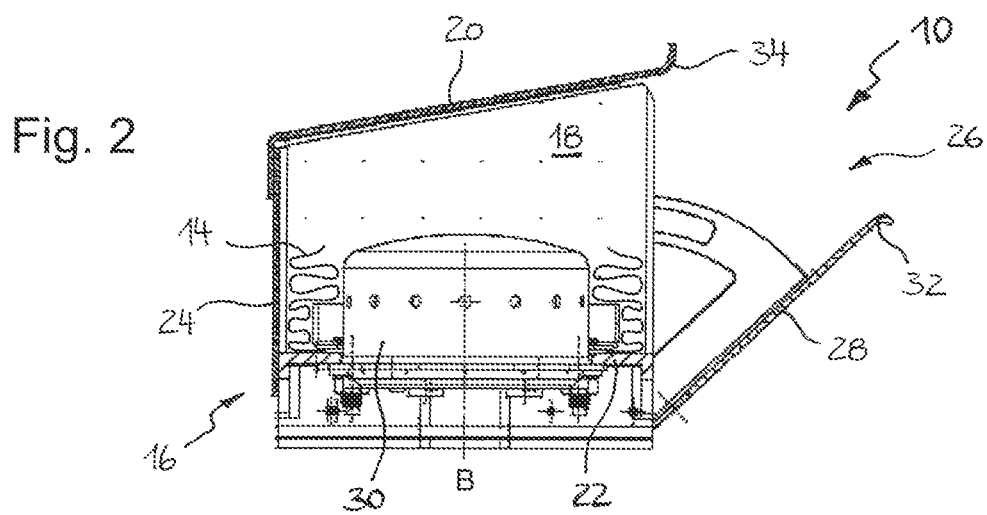
FIG. 2 shows a section across the driver airbag module according to FIG. 1 in its open position.
Figure 3:
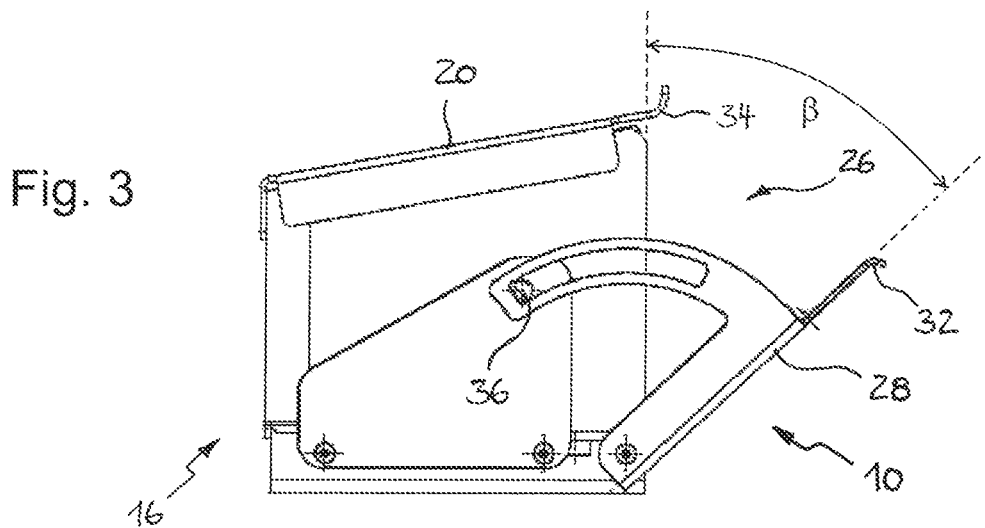
FIG. 3 shows another section across the driver airbag module according to FIG. 1 in its open position.

FIGS. 1 to 3 illustrate a driver airbag module 10 for installing on a steering device 12 which can be rotated about a steering axis A (see, e.g., FIG. 5). The driver airbag module 10 comprises an inflatable airbag 14 and a module housing 16 having a housing axis B substantially parallel to the steering axis A which defines a receiving chamber 18 for the folded airbag 14, wherein the receiving chamber 18 is delimited by a housing front wall 20 which faces a vehicle occupant when the driver airbag module 10 is installed, an opposing housing rear wall 22 which is axially spaced therefrom, and a peripheral housing lateral wall 24 which extends between the housing front wall 20 and the housing rear wall 22, the housing lateral wall 24 including an opening section 26 via which the airbag 14 deploys when the driver airbag module 10 is activated.

The opening section 26 of the housing lateral wall 24 in the shown exemplary arrangement is configured as a pivoting door 28, the door 28 being pivoted to the module housing 16 on the housing rear wall side and being radially movable, on the housing front wall side, between a closing position according to FIG. 1 and an open position according to FIGS. 2 and 3.

Furthermore, the driver airbag module 10 comprises a gas generator 30 which is accommodated at least partially in the module housing 16 and inflates the folded airbag 14 when the driver airbag module 10 is activated. The door 28 is moved from its closing position to its open position by the gas pressure increasing when the generator is triggered and by the resulting increasing deployment force of the airbag 14 in the receiving chamber 18 so that the airbag 14 can exit the receiving chamber 18 via the opening section 26 and can deploy in the direction of an occupant.

In order to intensify the deployment force of the airbag 14 acting on the door 28 and thus to accelerate the opening of the door and the deployment of the airbag, the housing front wall 20 is inclined relative to the housing rear wall 22 so that the receiving chamber 18 for the folded airbag 14 in the area of the door 28 has its maximum axial dimension $h_{max}$ and opposed to the door 28 has its minimum axial dimension $h_{min}$.

In one exemplary arrangement, an inclination angle α between the substantially flat housing front wall 20 and the substantially flat housing rear wall 22 is at least 10°. In one exemplary arrangement, the inclination angle α is: $10° \leq α \leq 30°$.

A housing front wall side door edge 32 abuts, in the closing position of the door 28, on a door-side housing edge 34 of the housing front wall 20, wherein the edges may form a gap or may be in contact with each other. According to FIG. 1, both the door edge 32 and the housing edge 34 are rounded respectively outwardly, i.e., away from the receiving chamber 18. A rounding radius amounts to at least 2 mm, and in one exemplary arrangement, about 5 mm.

FIG. 3 illustrates by way of example and schematically a door design of the driver airbag module 10, the module housing 16 having a limit stop 36 for the door 28 of the housing lateral wall 24. Based on the closing position of the door 28, a maximum door pivot angle β is reached in the open position of the door 28 defined by the limit stop 36 and in one exemplary arrangement, ranges from 30° to 60°.

FIGS. 4 to 7 illustrate a steering device 12 for a vehicle comprising an afore-described driver airbag module 10 in its closing position.

The steering device 12 is concretely configured as a vehicle steering wheel and comprises a grip portion 38 for manually operating the steering device 12 which grip portion can be rotated about the steering axis A, a hub portion 40 which is disposed radially inwardly from the grip portion 38, and a spoke portion 42 which interconnects the grip portion 38 and the hub portion 40, the driver airbag module 10 being installed on the hub portion 40 of the steering device 12 in such a way that the housing rear wall 22 of the module housing 16 abuts on the hub portion 40.

On a side of the housing front wall 20 remote from the folded airbag 14, according to FIG. 5 a wedge-shaped spacer 44 is disposed on which a display and/or input device 46 in the form of a touch screen is fastened in the shown exemplary arrangement.

The wedge-shaped spacer 44 in the present case compensates for the inclination of the housing front wall 20 so that the display and/or input device 46 extends substantially perpendicularly to the housing axis B, wherein generally any desired positioning of the display and/or input device 46 can be realized by the geometry of the spacer 44. According to a specific exemplary arrangement of the driver airbag module 10, the spacer is formed especially integrally with the housing front wall 20 of the module housing 16.

The spacer 44 is configured to be sufficiently stable to prevent or at least minimize bending of the housing front wall 20 due to the gas pressure increasing in the receiving chamber 18 when the module is activated. Further, in the spacer 44 a cavity may be provided, for example for receiving electric components of the display and/or input device 46.

In the shown exemplary arrangement, at least the spacer 44, optionally also the display and/or input device 46, is preassembled on the module housing 16 and is then fastened, together with the driver airbag module 10, to the hub portion 40 of the steering device 12.

Alternatively, it is also imaginable, as a matter of course, that the spacer 44 as well as the display and/or input device 46 are installed, only after fastening the driver airbag module 10 to the hub portion 40 of the steering device 12, as separate components or as a group of components either on the module housing 16 or on the steering device 12.

Figure 6:
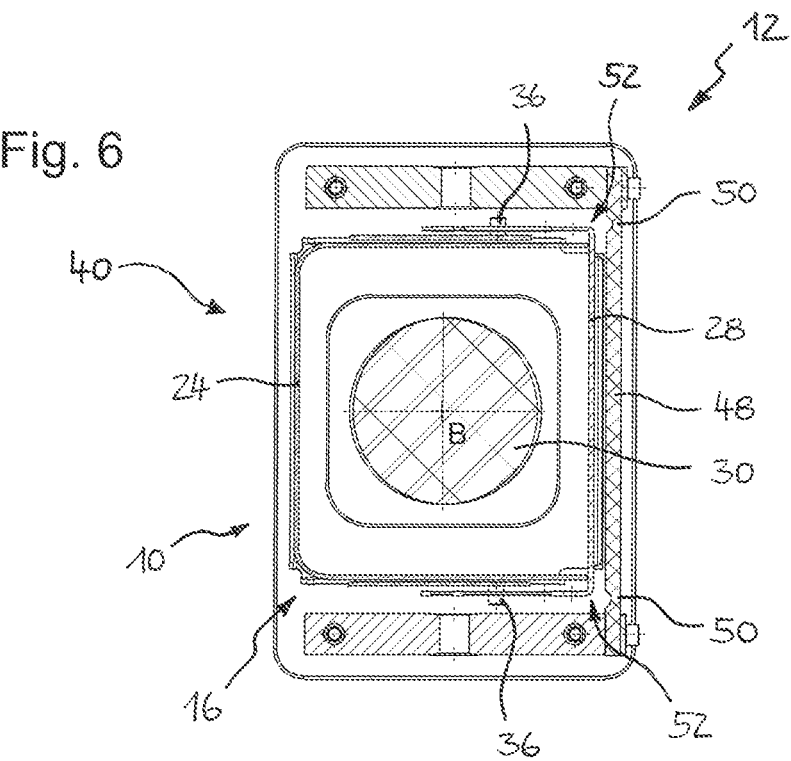
FIG. 6 shows a section VI-VI across a hub region of the steering device according to FIG. 5.
Figure 7:
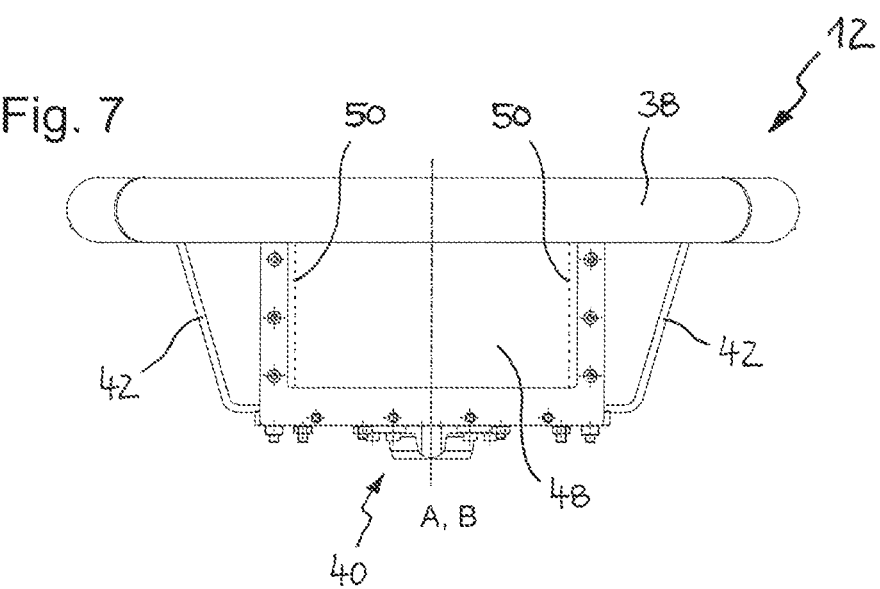
FIG. 7 shows a lateral view S of the steering device according to FIG. 5.

FIG. 6 shows a partial section VI-VI across the steering device 12 and illustrates that, adjacent to the housing lateral wall 24 of the driver airbag module 10, the hub portion 40 includes a steering device wall 48 in which linear weakening zones 50 extending along lateral edges 52 of the door 28 opposed in the peripheral direction are formed. The housing lateral wall 24 of the driver airbag module 10 peripheral in the circumferential direction with respect to the housing axis B in this case has a rectangular cross-section with four substantially flat side wall portions, one of the side wall portions being configured as a pivoting door 28 and defining the opening section 26 of the module housing 16.

In the shown exemplary arrangement, the steering device 12 includes a metal skeleton which is foam-wrapped, inter alia in the area of the grip portion 38, with plastic material. Accordingly, also the steering device wall 48 may be a foamed wall made of the foamed plastic material and is directly formed integrally with the hub portion 40 of the steering device 12 during foam-wrapping of the metal skeleton.

Figure 8:
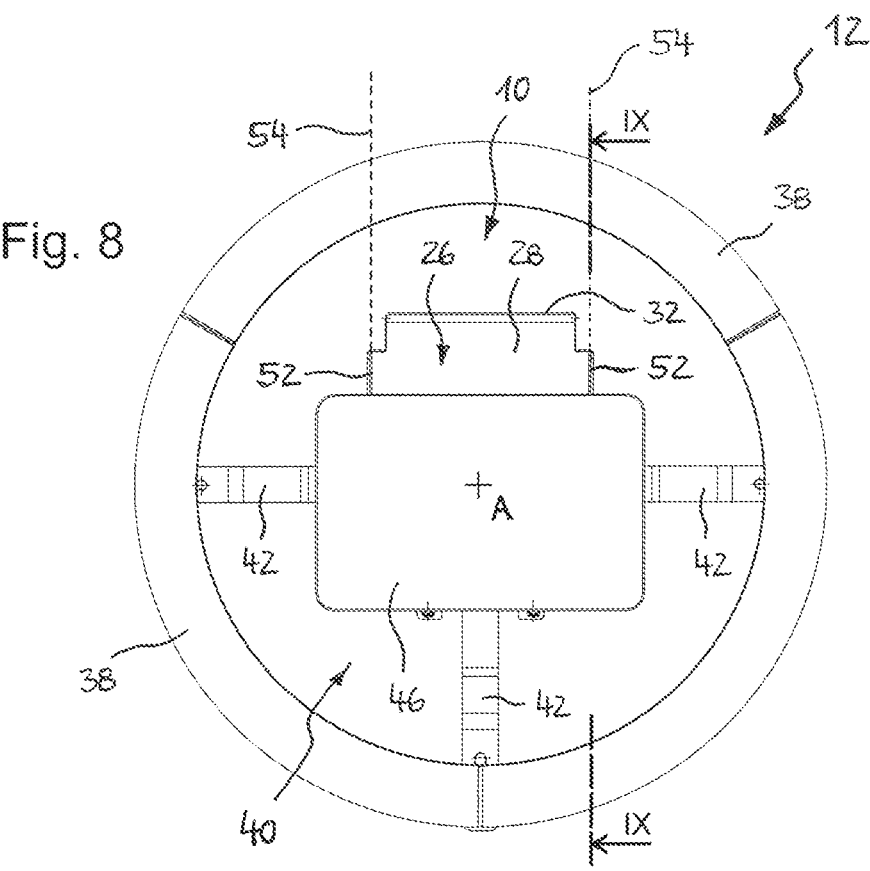
FIG. 8 shows a top view onto the steering device according to FIG. 4 comprising a driver airbag module according to the disclosure in its open position.
Figure 9:
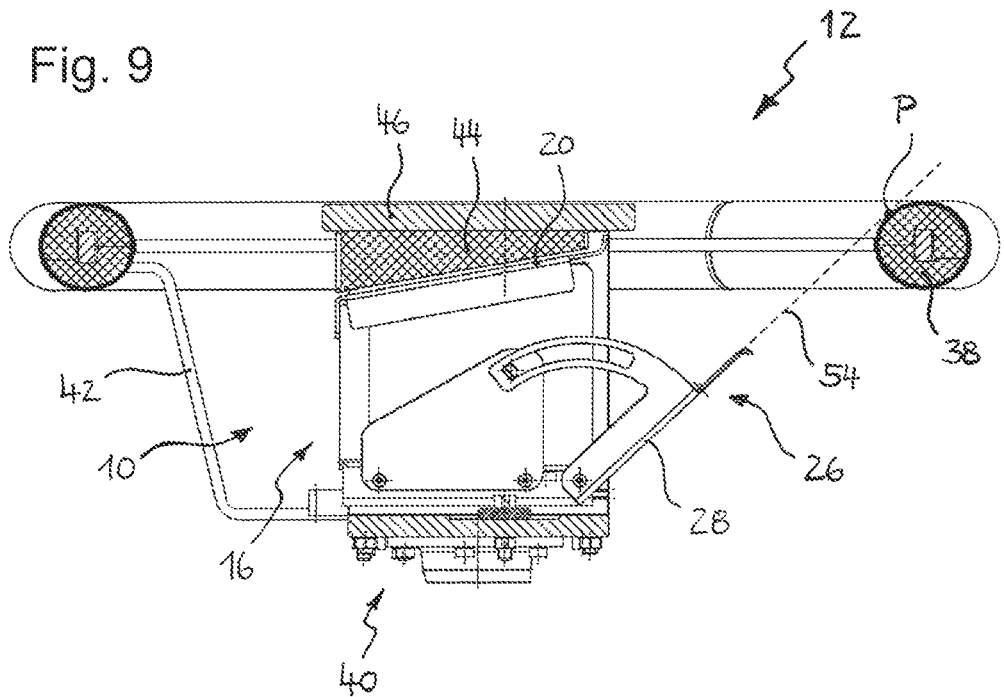
FIG. 9 shows a section IX-IX across the steering device according to FIG. 8.

FIGS. 8 and 9 show the steering device 12 according to FIGS. 4 to 7 with the driver airbag module 10 in its open position.

The driver airbag module 10 installed on the hub portion 40 of the steering device 12 is positioned in a circumferential direction in such a way that the door 28 and, resp., the opening section 26 defined in this way in a neutral position of the steering device 12 for straight-ahead travel shown in FIG. 8 is approximately in a "12 o'clock position" (viz. at the top according to FIG. 8). In the area about the 12 o'clock position, no spoke portions 42 are provided so that, when the module is activated, the airbag 14 can deploy unhindered between the hub portion 40 and the grip portion 38 in the direction of an occupant.

According to the present exemplary arrangement of the steering device 12, the grip portion 38 is in the form of a peripheral steering wheel rim. In its open position according to FIGS. 8 and 9, the pivoting door 28 adopts the maximum pivot angle $\beta$, wherein each of the opposed lateral edges 52 of the door 28 extends along a straight line 54 and the maximum pivot angle $\beta$ is selected such that the two straight lines 54 extend through the peripheral steering wheel rim and are tangent to the steering wheel rim especially in a contact point P. In this way, the inclined housing front wall 20 and the maximally pivoted door 28 help predefine a type of deployment channel for the airbag 14 which enables the airbag to deploy especially quickly and unhindered between the hub portion 40 and the grip portion 38 of the steering device 12 in the direction of the occupant. The module cover and, resp., the display and/or input device 46 remain fixed stationarily on the hub portion 40 of the steering device 12 when the module is activated and are covered by the airbag 14 when the airbag is completely deployed so as to prevent any contact with the occupant.

The invention claimed is:

1. A driver airbag module for installing on a steering device which can be rotated about a steering axis, comprising
    an inflatable airbag and
    a module housing with a housing axis which is substantially parallel to the steering axis, said module housing defining a receiving chamber configured to receive the inflatable airbag in a folded configuration,
    wherein the receiving chamber is delimited by a planar housing front wall configured to face a vehicle occupant when the driver airbag module is installed, an opposing housing rear wall which is axially spaced therefrom, and a housing lateral wall which extends between the planar housing front wall and the housing rear wall,
    wherein the planar housing lateral wall has an opening section via which the inflatable airbag deploys when the driver airbag module is activated,
    wherein when viewed in cross-section, the planar housing front wall is inclined relative to the housing rear wall such that one end of the planar housing front wall is positioned higher than an opposite end of the planar housing front wall, the receiving chamber for the inflatable airbag in the area of the opening section has a maximum axial dimension and opposed to the opening section has a minimum axial dimension.

2. The driver airbag module according to claim 1, wherein the housing front wall is inclined relative to the housing rear wall by an angle of inclination of at least 10 degrees.

3. The driver airbag module according to claim 2, wherein the angle of inclination $\alpha$ is: $10° \leq \alpha \leq 30°$.

4. The driver airbag module according to claim 2, wherein a spacer for fastening a module cover or a display and/or input device is disposed on a side of the housing front wall remote from the folded inflatable airbag.

5. The driver airbag module according to claim 1, wherein a spacer for fastening a module cover or a display and/or input device is disposed on a side of the housing front wall remote from the folded inflatable airbag.

6. The driver airbag module according to claim 5, wherein the spacer is wedge-shaped.

7. The driver airbag module according to claim 1, wherein the opening section of the housing lateral wall is a pivoting door.

8. The driver airbag module according to claim 7, wherein a housing front wall side door edge abuts on a door-side housing edge of the housing front wall, the door edge and/or the housing edge being rounded.

9. The driver airbag module according to claim 8, wherein a rounding radius of the rounded edge amounts to at least 2 mm.

10. The driver airbag module according to claim 8, wherein the module housing includes a limit stop for the door of the housing lateral wall, the limit stop defining a maximum pivot angle of the door in its open position.

11. The driver airbag module according to claim 7, wherein the module housing includes a limit stop for the door of the housing lateral wall, the limit stop defining a maximum pivot angle of the door in its open position.

12. A steering device for a vehicle comprising
a grip portion for manually operating the steering device which can be rotated about a steering axis,
a hub portion disposed radially inwardly from the grip portion, and
a spoke portion interconnecting the grip portion and the hub portion,
wherein a driver airbag module according to claim 5 is installed on the hub portion of the steering device.

13. The steering device according to claim 12, wherein the pivoting door in its open position adopts a maximum pivot angle and the grip portion is a peripheral steering wheel rim, wherein each of the opposing lateral edge of the door extends along a straight line and the maximum pivot angle is selected such that the two straight lines extend through the peripheral steering wheel rim.

14. The driver airbag module according to claim 7, wherein the pivoting door is pivoted on a housing rear wall side and is radially movable between a closing position and an open position on a housing front wall side.

15. The driver airbag module according to claim 1, wherein a spacer for fastening a module cover or a display and/or input device is disposed on a side of the housing front wall remote from the folded inflatable airbag.

16. The driver airbag module of claim 1, wherein the planar housing front wall extends an entire width of the receiving chamber when viewed in cross-section.

17. A driver airbag module for installing on a steering device which can be rotated about a steering axis, comprising
an inflatable airbag and
a module housing with a housing axis which is substantially parallel to the steering axis, said module housing defining a receiving chamber configured to receive the inflatable airbag in a folded configuration,
wherein the receiving chamber is delimited by a housing front wall configured to face a vehicle occupant when the driver airbag module is installed, an opposing housing rear wall which is axially spaced therefrom, and a housing lateral wall which extends between the housing front wall and the housing rear wall,
wherein the housing lateral wall has an opening section via which the inflatable airbag deploys when the driver airbag module is activated,
wherein the housing front wall is inclined relative to the housing rear wall by an angle of inclination $\alpha$ of between $10°\leq\alpha\leq30°$ such that the receiving chamber for the inflatable airbag in the area of the opening section has a maximum axial dimension and opposed to the opening section has a minimum axial dimension, and
wherein the opening section of the housing lateral wall is a pivoting door that is pivoted on a housing rear wall side and is radially movable between a closing position and an open position on a housing front wall side;
wherein the module housing includes a limit stop arrangement for the pivoting door, the limit stop arrangement including a pin member and a channel guide, wherein the pin member moves within the channel guide as the pivoting door is opened, the channel guide limiting the movement of the pivoting door.

18. A steering device for a vehicle comprising:
a grip portion for manually operating the steering device rotatable about a steering axis,
a hub portion disposed radially inwardly from the grip portion, and
a spoke portion interconnecting the grip portion and the hub portion, and
a driver airbag module installed on the hub portion of the steering device and rotatable about the steering axis, the driver airbag module comprising:
an inflatable airbag; and
a module housing with a housing axis which is substantially parallel to the steering axis, said module housing defining a receiving chamber configured to receive the inflatable airbag in a folded configuration,
wherein the receiving chamber is delimited by a housing front wall configured to face a vehicle occupant when the driver airbag module is installed, an opposing housing rear wall which is axially spaced therefrom, and a housing lateral wall which extends between the housing front wall and the housing rear wall,
wherein the housing lateral wall has a pivoting door via which the inflatable airbag deploys when the driver airbag module is activated,
wherein the housing front wall is inclined relative to the housing rear wall, and
wherein, adjacent to the housing lateral wall of the driver airbag module, the hub portion includes a steering device wall comprising linear weakening zones extending along lateral edges of the pivoting door opposed in a circumferential direction.

19. The steering device according to claim 18, wherein the pivoting door in its open position adopts a maximum pivot angle and the grip portion is a peripheral steering wheel rim, wherein each of the opposing lateral edges of the door extends along a straight line and the maximum pivot angle is selected such that the two straight lines extend through the peripheral steering wheel rim.

* * * * *